United States Patent [19]

Kobayashi et al.

[11] 4,099,068
[45] Jul. 4, 1978

[54] POWER SUPPLY INTERRUPTION DETECTING CIRCUIT

[75] Inventors: Tadahiro Kobayashi, Kawasaki; Teluo Tomura, Warabi, both of Japan

[73] Assignee: Fujitsu Limited, Kawasaki, Japan

[21] Appl. No.: 750,819

[22] Filed: Dec. 15, 1976

[30] Foreign Application Priority Data

Dec. 31, 1975 [JP] Japan ............... 50-158458

[51] Int. Cl.² ............................ H02M 1/18
[52] U.S. Cl. ............... 307/200 A; 361/86; 361/92; 361/187; 340/654; 340/663; 363/53; 307/318
[58] Field of Search ............ 321/11, 14, 47; 340/172.5, 248 B, 253 C; 361/86, 92, 187; 307/200 A, 318

[56] References Cited
U.S. PATENT DOCUMENTS

| | | | |
|---|---|---|---|
| 3,243,658 | 3/1966 | Blackburn | 307/200 A |
| 3,351,770 | 11/1967 | O'Sullivan et al. | 307/200 A |
| 3,359,457 | 12/1967 | King | 307/200 A |
| 3,745,375 | 7/1973 | Huruse | 307/200 A |

*Primary Examiner*—John S. Heyman
*Attorney, Agent, or Firm*—Staas & Halsey

[57] ABSTRACT

A power supply interruption detecting circuit which prevents an error in a write signal or sending and receiving signals of a data processing unit in the case of interruption of a commercial power supply or a power supply voltage drop resulting from an accident of other units connected to the same power supply. An abrupt drop of the power supply input voltage is detected by comparing the voltage of a CR circuit of a small time constant with the voltage of a CR circuit of a relatively large time constant. A slow input voltage drop is detected by comparing the voltage of the CR circuit of small time constant with a constant reference voltage. The power supply interruption is rapidly detected in substantially a constant short time regardless of input voltage variations and the write signal or the sending and receiving signals are each clamped at predetermined logic voltage, by which sending and writing of an error signal can be effectively prevented.

3 Claims, 5 Drawing Figures

POWER SUPPLY INTERRUPTION DETECTING CIRCUIT

BACKGROUND OF THE INVENTION

1. Field of the Invention

This invention relates to a power supply interruption detecting circuit for preventing occurrence of an error in a write signal or sending and receiving signals in a data processing unit in the case of AC power supply interruption.

2. Description of the Prior Art

When the computer was used only in the offline system at an early stage, it was sufficient merely to supply a CVCF power as the power supply of the computer system. But since the computer has been used in the online system, a non-stop CVCF power supply is required as a measure for power supply interruption because the online system does not allow of any interruption of its operation. However, the non-stop CVCF power supply perfectly fulfills its function as a non-stop power supply in the case of the commercial power interruption, but has no useful function in the case of a trouble of the power supply itself. Further, even if a reserve machine is provided for the power supply, the operation is interrupted in the case of switching from the main power supply to the standby facility. Moreover, if a power supply of good quality is produced by paying much attention to its design, working, materials and parts to provide for enhanced reliability in the power supply itself and if it is carefully maintained, troubles of the power supply can be decreased but it is impossible to exterminate the trouble. Furthermore, where a plurality of data processing units are connected to the same AC power supply, occurrence of a fatal accident in one of the units also interrupts the power supply to the other units for a short time.

By the way, the data processing units include a remote terminal unit, a teletypewriter, a printer, a punched tape card reader, a magnetic disc, a magnetic tape, etc., and almost all of them are those which send and receive signals between them or write signals on record media.

In such units, a direct current is produced from an AC power supply and a DC power is supplied to each electronic circuit in the units. In this case, in the transient state of connection and disconnection of the AC input, the normal DC output voltage cannot be retained and each electronic circuit in the unit cannot be maintained in its normal logic state. To avoid this, a special power on-off signal is used to clamp the sending and receiving signals or the write signal at a predetermined logic voltage, thereby prevent the signal from becoming an error signal.

With this method, however, where the AC power supply is cut off outside of the apparatus, it is impossible to prevent sending of an error signal from the data processing unit or write of the error signal.

Even if a power supply interruption detecting circuit is provided in one data processing unit to prevent false write and transmission, it is impossible to prevent reception of an error signal sent out from other data processing units.

In the prior art, a power supply interruption detecting relay is connected to the AC input circuit, and is adapted to be released upon cutting off of the AC input, thereby clamping the write signal or the sending and receiving signals with the relay contact. However, the level of the voltage detection by the release of the relay is not constant, and in anticipation of a long release time, the capacity of a smoothing circuit is required to be selected larger than is necessary so that a normal DC output voltage may be retained in the release time.

SUMMARY OF THE INVENTION

An object of this invention is to provide a power supply interruption detecting circuit which rapidly detects interruption of an input AC power supply and clamps sending and receiving signals or a write signal of a data processing unit is clamped at a predetermined voltage, thereby to protect electronic circuits in the data processing unit.

Another object of this invention is to provide a power supply interruption detecting circuit which detects an input voltage having dropped below a predetermined value due to incomplete interruption of an input AC power supply.

Another object of this invention is to provide a power supply interruption detecting circuit which does not detect allowed voltage variations of an input AC power supply, and causes a relay to keep on operating.

Another object of this invention is to provide an inexpensivwe power supply interruption detecting circuit in which the capacity of a smoothing circuit, that is, the value of a capacitor, dependent upon the value of a load connected, is not selected larger than is necessary.

Still another object of this invention is to provide a power supply interruption detecting circuit designed so that when an additional circuit is connected, one part of a full-wave rectifier circuit is used in common.

According to this invention, in a circuit in which a DC output voltage is produced from an input AC power supply through a rectifying and smoothing circuit and is compared with a certain reference voltage to thereby detect interruption of the input AC power supply, a rectifier circuit is connected to the input AC power source in addition to the rectifying and smoothing circuit; a CR circuit of a small time constant is connected as a load of the rectifier circuit; and a circuit is provided for detecting that the terminal voltage of the CR circuit has dropped below a constant ratio with respect to the DC output voltage.

DESCRIPTION OF THE PREFERRED EMBODIMENTS

Figure 1:
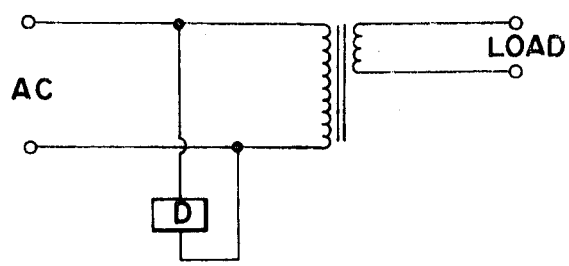
FIG. 1 is a connection diagram showing an example of a conventional power supply interruption detecting circuit.
Figure 2:
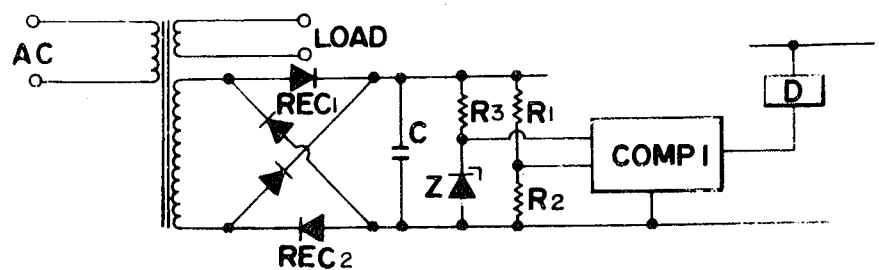
FIG. 2 is a connection diagram, similar to FIG. 1, illustrating another example of a conventional power supply interruption detecting circuit.

Referring to FIGS. 1 and 2, conventional power supply interruption detecting circuits will be described first.

In FIG. 1, a power supply interruption detecting relay D is connected in parallel to an AC input circuit, and is always held in its operative state. If an AC input AC is cut off, the relay D is made inoperative, by which a write signal and sending and receiving signals of an electronic circuit connected to a load circuit LOAD through a relay contact of the relay D are clamped at a voltage of logic "0" and at a predetermined logic voltage, respectively.

In the circuit of FIG. 1, however, while a voltage lower than a predetermined input voltage value is retained for many hours due to incomplete interruption of the input AC power supply, the relay D continues its operation without detecting the power supply interruption, but since the DC output voltage drops, the electronic circuit connected to the load circuit LOAD is put in an abnormal state in some cases.

The circuit shown in FIG. 2 is a circuit improved from the circuit of FIG. 1. In FIG. 2, the AC input voltage AC is rectified and smoothed by a full-wave rectifier circuit REC1·REC2 and a smoothing capacitor C, respectively, to obtain a DC voltage, and a constant reference voltage is derived from a Zener diode Z and at the same time, $R_2/(R_1+R_2)$ of the rectified and smoothed output is obtained, and they are applied to a comparator circuit COMP1. Since the Zener diode Z is capable of holding substantially a constant output voltage regardless of its conduction current as is well-known, the terminal voltage of the Zener diode is retained constant irrespective of a change in the load current or the power source voltage by a suitable selection of the Zener voltage and the resistance value of a resistor R3.

When the AC input AC is cut off, the compared voltage $\{R_2/(R_1+R_2)$ of the rectified and smoothed output voltage} drops in a constant ratio to the constant reference voltage (the terminal voltage of the Zener diode Z), so that the comparator circuit COMP1 detects the voltage drop below the reference voltage to release the relay D. By the contact of the relay D, the write signal of the electronic circuit is clamped and the sending and receiving signals are clamped at the predetermined logic voltages, thereby protecting the circuit.

In the circuit of FIG. 2, where the input voltage has slowly dropped due to incomplete interruption of the AC power supply, the power supply interruption can be detected at the moment when the input voltage has dropped below the terminal voltage of the Zener diode Z (the reference voltage). Accordingly, the circuit of FIG. 2 is excellent as compared with the circuit of FIG. 1. In the circuit of FIG. 2, however, in the case of charging the capacitor C with the smoothed output, for example, when the AC input AC has a frequency of 50 Hz, the capacitor C is intermittently charged and discharged at intervals of 10 mS, so that the reference voltage for comparison must be set below a minimum discharge value. Further, the input AC voltage AC is allowed of an appreciable fluctuation, but the comparator circuit COMP1 must not be respond to the allowed voltage fluctuation. Accordingly, the reference voltage is required to be set at a considerably small voltage value, so that in the case of a high input voltage, the comparator circuit COMP1 does not operate until the rectified and smoothed output voltage drops to an appreciably small value. Therefore, the power supply interruption detecting time is as long as 30 to 40 mS, for instance, and to maintain the DC output voltage at its normal value in this period, the capacity of the smoothing capacitor C is required to be increased more than is necessary.

The present invention has been proposed to overcome the defects of the circuits of FIGS. 1 and 2 described above. One embodiment of this invention will hereinafter be described with regard to FIG. 3.

Figure 3:
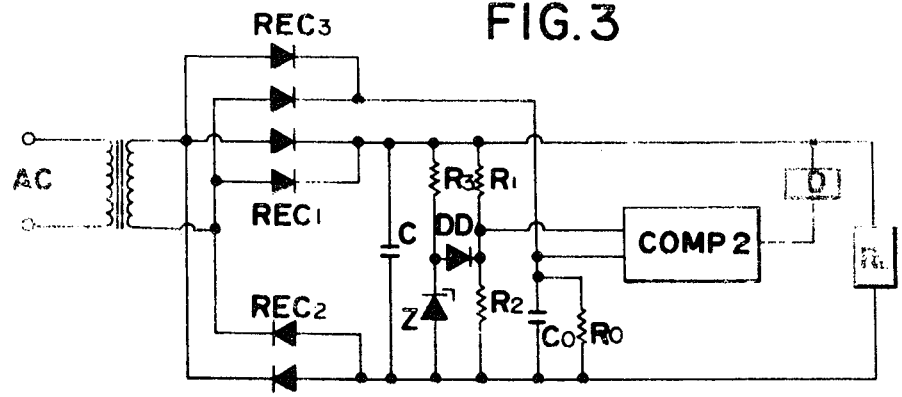
FIG. 3 is a connection diagram showing a power supply interruption detecting circuit embodying this invention.

In FIG. 3, reference character AC indicates an AC input power supply; REC1 and REC2 designate rectifier elements making up a rectifier circuit REC1·REC2 for producing a DC output voltage; REC3 identifies an additional rectifier element; C denotes a smoothing capacitor; Z represents a Zener diode; C0 and R0 respectively show a capacitor and a resistor of small time constant, which form a parallel circuit C0·R0; COMP2 refers to a comparator circuit; D indicates a power supply interruption detecting relay; $R_L$ designates a load of a rectifying and smoothing circuit REC1·REC2·C which is formed with the rectifier circuit REC1·REC2 and the smoothing capacitor C; and $R_1$ and $R_2$ denote dividing resistors.

In FIG. 3, a full-wave rectifier circuit REC3·REC2, which is comprised of the rectifier element REC3 connected to the plus side and the rectifier element REC2 of the minus side, is connected in parallel with the rectifier circuit REC1·REC2 for producing a normal DC output and the smoothing capacitor C. That is, the rectifier element REC2 of the minus side is used in common to the both rectifier circuits REC1·REC2 and REC3·REC2.

The circuit which supplies a voltage to the load $R_L$ from the rectifying and smoothing circuit REC1·REC2·C, will hereinafter be referred to as the main circuit, and the circuit which supplies a voltage to the capacitor C0 and the resistor R0 from the rectifier circuits REC3·REC2, will hereinafter be referred to as the additional detector circuit.

A series circuit of the resistors R1 and R2 and a series circuit of a resistor R3 and the Zener diode Z are connected in parallel as loads of the rectifying and smoothing circuit REC1·REC2·C in the main circuit, and a diode DD is connected between the connection points of the abovesaid series circuits.

The parallel circuit C0·R0 of small time constant is connected as a load of the rectifier circuit REC3·REC2 in the additional detector circuit. As will be described later on, the smaller the time constant of the capacitor C0 and the resistor R0 become, the shorter the power supply interruption detecting time becomes.

The comparator circuit COMP2 is supplied with a divided voltage $R_2/(R_1+R_2)$ of the normal DC output and the terminal voltage of the parallel circuit C0·R0 at the same time. The comparator circuit COMP2 compares the two inputs with each other, and release the relay D upon detecting that the voltage of the parallel circuit C0·R0 has dropped lower than a certain ratio to the divided voltage of the DC output.

The capacitance value of the capacitor C of the main circuit is determined in relation to the value of current supplied to the load $R_L$ and a ripple of the output. Thus, the capacity of the capacitor C is substantially dependent upon the load $R_L$, but in the case of a long power supply interruption detecting time, it is necessary to increase the capacity of the capacitor C so as to hold the output voltage constant during the detection of the power supply interruption.

The capacity of the capacitor C is appreciably large and the resistance value of the load $R_L$ is smaller than those of the voltage dividing resistors R1, R2 and R3, so that the time constant of the main circuit is determined dependent mainly upon the values of the capacitor C and the load $R_L$. Accordingly, when the input AC power supply AC has been interrupted, the DC output of the main circuit drops with a time constant $\tau_A = \lambda \cdot D \cdot R_L$.

On the other hand, the output voltage of the additional detecting circuit drops with a time constant $\tau B = C0l9\ R0$ in the case of a power supply interruption.

The power supply interruption detecting circuit of FIG. 3 is designed to detect the power supply interruption in two cases: one is for a case in which the AC input power supply AC is interrupted by an accident of a power station or a power cable and the input voltage drops abruptly, and the other is for a case in which where instruments of high impedance are connected in parallel to the same power supply, a transient current flows and the input voltage does not drop immediately in spite of the power supply interruption by a similar accident, or a case in which where induction motors of low impedance are connected to the same power supply, even if the power supply is interrupted, the motors keep on revolving to serve as generators and the input voltage drops only slowly.

For the detection of an abrupt input voltage drop in the former case, in the comparator circuit COMP2 the terminal voltage of the circuit C0·R0 and the divided voltage R2/(R1+R2) of the DC output are compared with each other to detect that the terminal voltage of the circuit C0·R0 has dropped lower than the other, and then the relay D is released. For the detection of a slow input voltage drop in the latter case, the terminal voltage of the circuit C0·R0 and that of the Zener diode Z are compared with each other to detect that the terminal voltage of the circuit C0·R0 has dropped lower than the other, and then the relay D is released. In either case, the comparator circuit COMP2 compares the terminal voltage of the circuit C0·R0 with either one of the divided voltage and the Zener voltage which is higher than the other.

The Zener diode Z is always supplied with a current flowing through the resistor R3, and operates in its breakdown area, so that it always maintains its terminal voltage constant regardless of load current or power supply voltage variations. However, since the divided voltage R2/(R1+R2) of the DC output is usually higher than the abovesaid Zener voltage (the terminal voltage of the Zener diode Z), the diode DD is cut off and the comparator circuit COMP2 is supplies with the divided voltage R2/(R1+R2). When the input voltage drops slowly as a result of the power supply interruption, the DC divided voltage also drops in proportion to the input voltage, and when the DC divided voltage has dropped below the Zener voltage, the diode DD is turned on to apply the Zener voltage to the comparator circuit COMP2 in place of the DC divided voltage.

Figure 5:
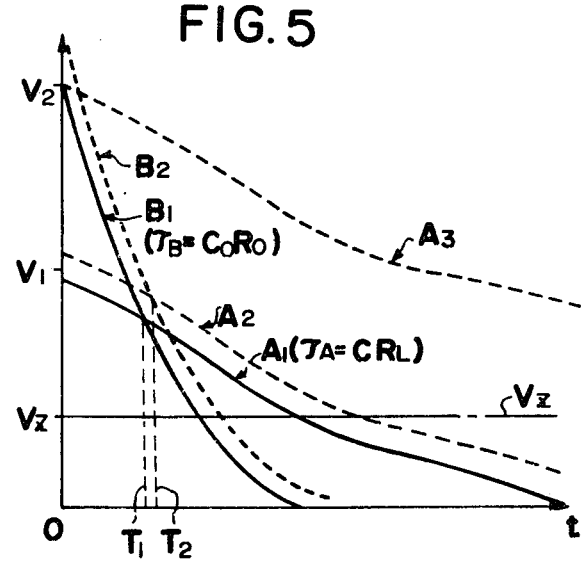
FIG. 5 is a time chart of a power supply interruption detecting operation in the case of an input voltage having dropped in FIG. 3.

Referring now to FIG. 5, the circuit operation of FIG. 3 will be described.

In FIG. 5, the ordinate represents voltage and the abscissa time. The curve B1 is a voltage curve indicating the state in which the terminal voltage of the circuit C0·R0 drops from V2 with a time constant $\tau_B = C0 \cdot R0$ owing to the power supply interruption; the curve A1 is a voltage curve indicating the state in which the divided voltage R2/(R1+R2) of the DC output drops from V1 with a time constant $\tau_A = C \cdot R_L$ due to the power supply interruption; the curve A3 is a voltage curve indicating the state in which the DC output drops; and the straight line $V_Z$ indicates the constant Zener voltage.

FIG. 5 shows voltage-time curves in the case of a rapid input voltage drop resulting from the power supply interruption. As the input power supply voltage rises, the terminal voltage of the circuit C0·R0 also rises in proportion thereto, and the DC output voltage of the main circuit also rises. Let it be assumed that the terminal voltage of the circuit C0·R0 and the DC output voltage are both at the voltage level of V2 at the moment of the power supply interruption. With the power supply interruption, the terminal voltage of the circuit C0·R0 drops along the curve B1 with a small time constant $\tau_B$, but the DC output voltage drops along the curve A3 with a large time constant $\tau_A$. Provided that the divided voltage R2/(R1+R2) of the DC output lies at the voltage level of V1 at the moment of the power supply interruption, the DC divided voltage drops along the curve A1 parallel to the curve A3. The comparator circuit COMP2 compares the levels of the curves B1 and A1 with each other to detect the moment $T_1$ at which the curve B1 crosses the curve A1, and then operates to stop the relay D.

The circuit C0·R0 normally repeats charging and discharging at intervals of, for example, 10 mS, and has a very small time constant. Accordingly, if this circuit is set so that its voltage may be reduced to 50% of its normal voltage value in 10 mS in the power supply interruption, the comparator circuit COMP2 detects that after the voltage of the circuit C0·R0 has been reduced to 50% with respect to the DC divided voltage, the next charging current would not arrive. Since the comparator circuit COMP2 thus monitors the power supply interruption with the sharp curve B1 and the relatively gentle curve A1, the time for detecting the power supply interruption is constant substantially regardless of power supply variations, and no time lag occurs in the detection of the power supply interruption.

Another merit of the circuit of FIG. 3 is that the time for detecting the power supply interruption hardly varies with the magnitude of the input voltage. That is, when the input voltage rises a little, the DC divided voltage and the voltage of the circuit C0·R0 both become higher than the voltages V1 and V2 in the same ratio, so that the power supply interruption is detected at the moment $T_2$ at which the curves A2 and B2 crosses each other, namely at substantially the same moment as $T_1$.

Next, in the case where the input voltage has been gradually reduced to the same extent as the time constant $C \cdot R_L$ of the DC output as a result of the power supply interruption, the voltage of the circuit C0·R0 also gradually drops substantially in proportion to the DC output regardless of the time constant $\tau_B = C0 \cdot R0$. That is, if the input voltage drops 10%, the DC divided voltage and the voltage of the circuit C0·R0 both drop 10%, and the both voltages slowly drops in proportion to the input voltage, so taht if the Zener diode Z is not connected, the both voltages drop to 0V along parallel curves: the curves do not cross each other and the power supply interruption cannot be detected. In the circuit of FIG. 3, however, the Zener diode Z is connected and when the DC divided voltage alowly drops lower than the Zener voltage $V_Z$, since the Zener voltage $V_Z$ is applied as the reference voltage to the comparator circuit COMP2, it is also possible to effectively detect the state of a slow input voltage drop.

Figure 4:
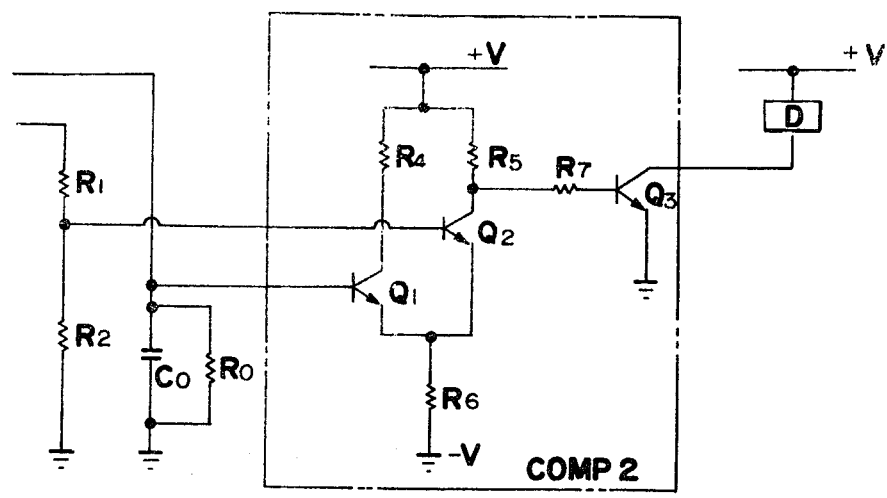
FIG. 4 is a connection diagram of a voltage comparator circuit used in FIG. 3.

The comparator circuit COMP2 in FIG. 3 can be formed with a differential amplifier as shown in FIG. 4.

The base of a transistor Q1 of the differential amplifier is supplied with the voltage of the circuit C0·R0 and the base of the other transistor Q2 is supplied with the DC divided voltage. In the normal state, since the voltage of the circuit C0·R0 is higher than the DC divided voltage, the transistor Q1 is held in its on state and the transistor Q2 is held in its off state. Accordingly, a current passing through a resistor R4 from the power supply (+)V flows in the power supply (−)V through the collector and emitter of the transistor Q1 and a resistor R6. The collector voltage of the transistor Q2 rises and this voltage is applied to the base of a transistor Q3 through a resistor R7 to turn on the transistor Q3, so that the current from the power supply (+)V flows in the relay D and the collector and emitter of the transistor Q3 to make the relay D operative.

When the input voltage drops abruptly by the power supply interruption, the terminal voltage of the circuit C0·R0 drops with the small time constant $\tau_B$, and at that moment when the terminal voltage becomes lower than the DC divided voltage, the transistor Q1 is altered to its off state and the transistor Q2 is put in its on state. Upon turning on of the transistor Q2, the collector voltage is reduced, so that the voltage to be applied to the base of the transistor Q3 is also reduced to turn off the transistor Q3, putting the relay D in its pulled-down state. Further, when the power supply input voltage drops slowly, the Zener voltage is applied to the base of the transistor Q2 in place of the DC divided voltage, and when the voltage of the circuit C0·R0 becomes lower than the Zener voltage, the on-off states of the transistors Q1 and Q2 are changed over.

Though not illustrated in the drawings, when the relay D has been put in its released state, its contact operates to clamp the write signal in the electronic circuit at a voltage of logic "0" and the sending and receiving signals at predetermined logic voltages.

Where the write voltage remains, if the logic voltage drops due to the power supply interruption, it is not clear whether the logical state is "1" or 37 0," introducing the possibility of writing an error signal when a final-stage driver has been turned on.

Further, in the case of storing signal information to be delivered out and previously received signal information, if the logic voltage is reduced by the power supply interruption, false information is stored.

To avoid the above erroneous operations, the write voltage is clamped at the logic "0" and the sending and receiving signals are respectively clamped at logic voltages.

In the circuit of FIG. 3, it is also possible to connect the rectifier element REC to the minus side of the AC input power supply AC with its plus side used in common. In such a case, the Zener diode Z is connected with its polarity reversed and in the comparator circuit COMP2, negative voltages are compared with each other, thereby to detect the moment when the voltage of the circuit C0·R0 becomes more positive than the DC divided voltage or the Zener voltage.

As has been described above, in the present invention, it is detected that the voltage of the CR circuit of a small time constant drops below a certain ratio with respect to the DC divided voltage of a large time constant and the constant Zener voltage, that is, the above said voltage becomes lower than either one of the DC divided voltage and the Zener voltage which is higher than the other. Consequently, when the input voltage has dropped abruptly due to the power supply interruption, it is possible to rapidly detect the power supply interruption in substantially a constant time regardless of AC input voltage variations. Further, in the case where motors are connected to the same power supply, even if the power supply is cut off, the motors serve as generators, so that when the input voltage has dropped slowly, the low voltage can be effectively detected by comparing the voltage of the CR circuit and the Zener voltage with each other.

Moreover, upon detection of the power supply interruption, the logic voltage is clamped by the relay contact before it becomes abnormal, but it is necessary that the longer the time for clamping the signal is, the more the capacity of DC for holding the DC output voltage within a predetermined value is increased. In the present invention, however, since the power supply interruption detecting time can be shortened, the capacity of the smoothing capacitor C need not be increased more than a value determined by the load current and the ripple percentage.

It will be apparent that many modifications and variations may be effected without departing from the scope of the novel concepts of this invention.

What is claimed is:

1. A power supply interruption detecting circuit in which a DC output voltage is picked up from an input AC power supply through a rectifying and smoothing circuit and the DC output voltage and a reference voltage are compared with each other to detect the interruption of the input AC power supply, comprising:
    a rectifier circuit connected to the input AC power supply in addition to the rectifying and smoothing circuit;
    a capacitance-resistance circuit having a smaller time constant than the rectifying and smoothing circuit, connected as a load of the rectifier circuit; and
    a circuit for detecting that the terminal voltage of the capacitance-resistance circuit has dropped below a predetermined ratio with respect to the DC output voltage, using the terminal voltage of the capacitance-resistance circuit as the reference voltage.

2. The power supply interruption detecting circuit according to claim 1, which further includes a circuit for comparing the terminal voltage of the capacitance-resistance circuit with an other voltage, either a divided voltage of the DC output voltage or the terminal voltage of a Zener diode, whichever is higher, thereby to detect that the terminal voltage has become lower than the other voltage.

3. The power supply interruption detecting circuit according to claim 1, in which when the additional rectifier circuit is connected to the input AC power supply in addition to the rectifying and smoothing circuit for obtaining the normal DC output voltage, a rectifier element is connected to either the plus or minus side of the input AC power supply and the rectifier element on the other side is used in common to the rectifying and smoothing circuit.

* * * * *

UNITED STATES PATENT AND TRADEMARK OFFICE
CERTIFICATE OF CORRECTION

PATENT NO. : 4,099,068
DATED : July 4, 1978
INVENTOR(S) : TADAHIRO KOBAYASHI ET AL.

It is certified that error appears in the above-identified patent and that said Letters Patent are hereby corrected as shown below:

Col. 1, line 19, delete "of";

Col. 1, line 53, "prevent" should be --preventing--;

Col. 2, line 25, "inexpensivwe" should be --inexpensive--;

Col. 3, line 19, "REC1.REC2" should be --REC1·REC2--;

Col. 3, line 57, delete "be";

Col. 4, line 7, "REC1.REC2" should be --REC1·REC2--;

Col. 5, line 7, "CO19RO" should be --CO·RO--;

Col. 5, line 48, "supplies" should be --supplied--;

Col. 6, line 57, "taht" should be --that--;

Col. 6, line 62, "alowly" should be --slowly--;

Col. 7, line 40, "370"" should be --"0"--.

Signed and Sealed this

Fifteenth Day of May 1979

[SEAL]

Attest:

RUTH C. MASON
Attesting Officer

DONALD W. BANNER
Commissioner of Patents and Trademarks